V. R. DUNNING.
TRACTOR FOR HARVESTERS AND THE LIKE.
APPLICATION FILED DEC. 4, 1914.
1,148,505.
Patented Aug. 3, 1915.
2 SHEETS—SHEET 1.
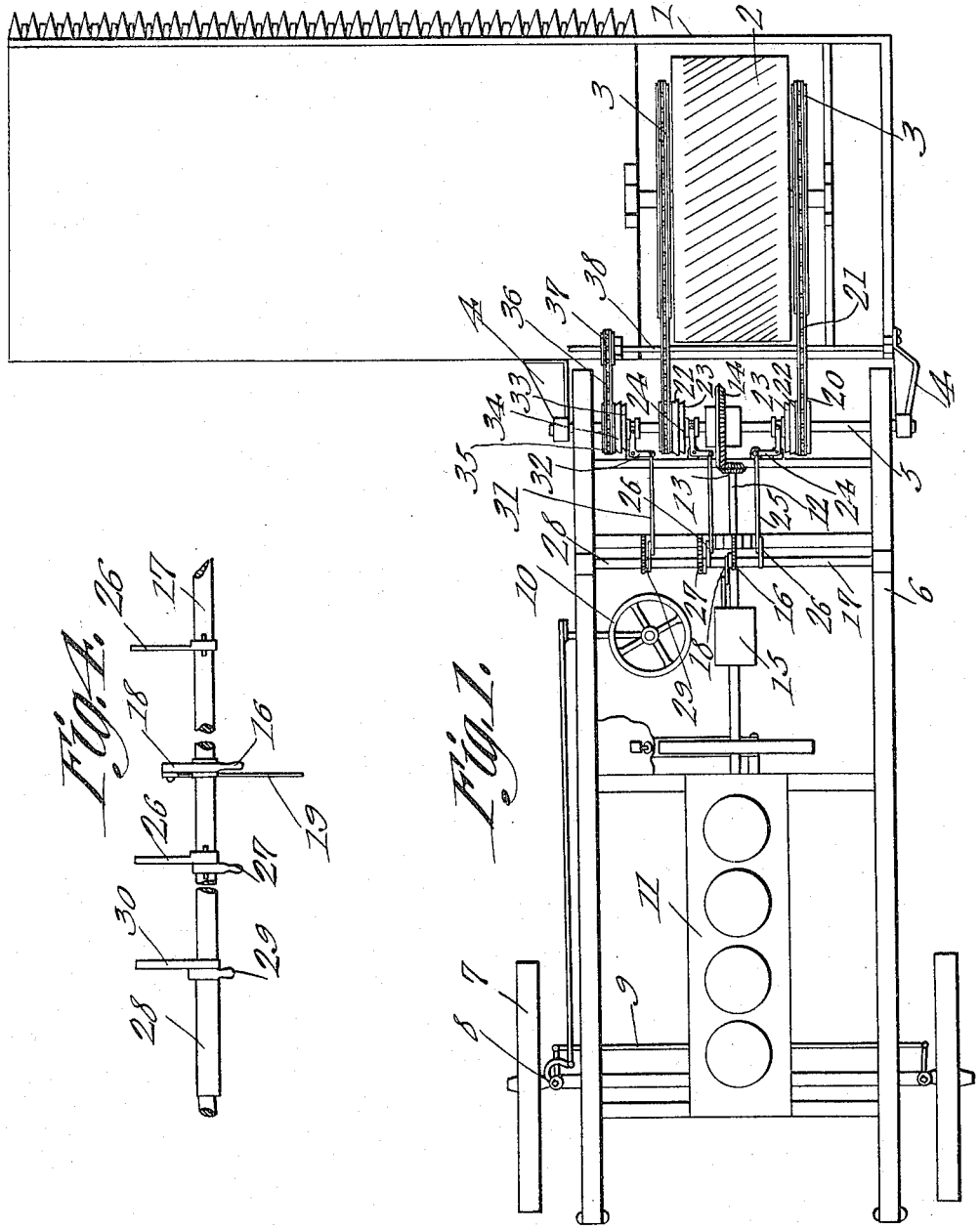
Witnesses
J. R. Tomlin
M. E. McCarthy
V. R. Dunning
Inventor
by C. A. Snow & Co.
Attorneys V. R. DUNNING.
TRACTOR FOR HARVESTERS AND THE LIKE.
APPLICATION FILED DEC. 4, 1914.
1,148,505.
Patented Aug. 3, 1915.
2 SHEETS—SHEET 2.
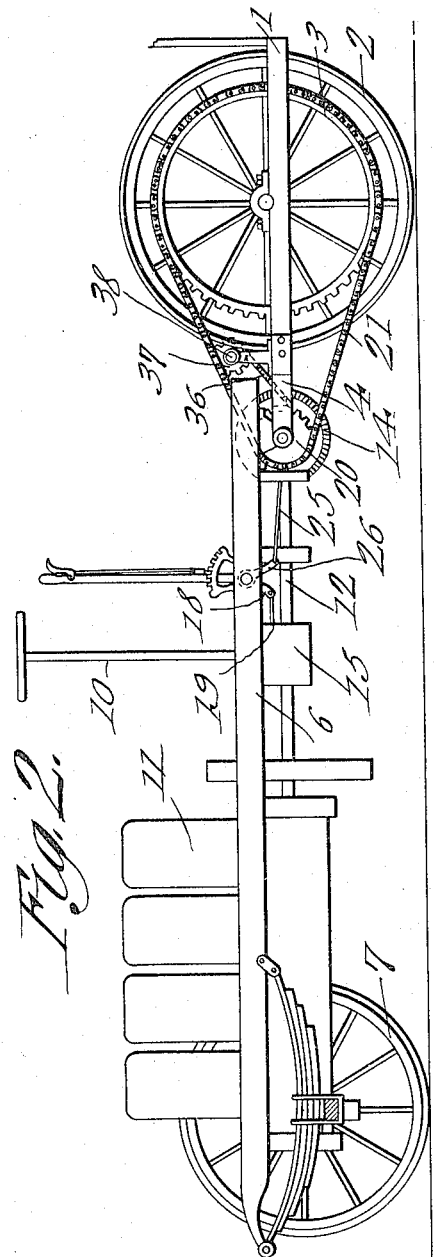
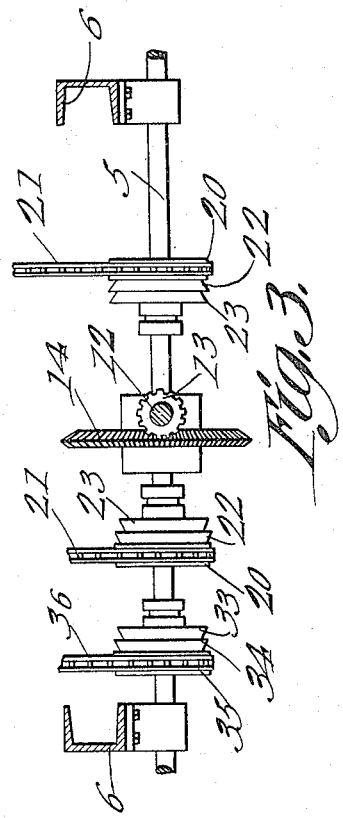

UNITED STATES PATENT OFFICE.

VIRGIL R. DUNNING, OF OSHAWA, MINNESOTA.

TRACTOR FOR HARVESTERS AND THE LIKE.

1,148,505. Specification of Letters Patent. Patented Aug. 3, 1915.

Application filed December 4, 1914. Serial No. 875,513.

*To all whom it may concern:*

Be it known that I, VIRGIL R. DUNNING, a citizen of the United States, residing at Oshawa, in the county of Nicollet and State of Minnesota, have invented a new and useful Tractor for Harvesters and the like, of which the following is a specification.

This invention relates to tractors particularly designed for use in connection with harvesters and like agricultural machines, one of the objects being to provide a tractor which is simple and compact, can be readily controlled, and which operates to push forwardly upon the agricultural machine coupled thereto so as not only to drive the supporting wheel of the machine but to also actuate the harvesting or other mechanism carried by the machine.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a portion of a harvester having the present improvements combined therewith, the harvester mechanism being removed. Fig. 2 is a side elevation of the structure shown in Fig. 1. Fig. 3 is an enlarged transverse section through the tractor and showing a portion of the propelling mechanism. Fig. 4 is a plan view of the controlling levers and their shafts.

Referring to the figures by characters of reference 1 designates the frame of a harvester structure, the same being provided at one side with the usual supporting wheel 2 and secured to each side of this wheel so as to rotate therewith are sprockets 3. Brackets 4 are extended rearwardly from the frame 1 and are engaged by the end portions of a shaft 5 which is journaled within the chassis 6 of the tractor, this chassis being supported at its rear end by wheels 7 corresponding with the ordinary front or steering wheels of a motor vehicle, these wheels being provided with knuckles 8 and with connections 9 between the knuckles whereby, when a steering wheel 10 is actuated, the said wheels 7 will be swung so as to steer the machine. The specific means for actuating the wheels 7 for the purpose of steering the tractor constitutes no part of the present invention but can be one of the various well known mechanisms provided for this purpose.

A motor 11 is supported by the chassis between the steering wheels 7 and drives a shaft 12 to which is connected a gear 13 meshing constantly with a gear 14 secured to the shaft 5. Reversing gears (not shown) may be provided, these gears being housed within a casing 15 as ordinarily and being controlled by a lever 16 loosely mounted upon a transverse shaft 17. This lever has an arm 18 connected by a rod 19 to the reverse gearing so that, when the lever is shifted in one direction, shaft 12 will be driven one way and, when the lever is shifted in the other direction, the rotation of the shaft 12 will be reversed.

Loosely mounted on the shaft 5 are sprockets 20 each of which transmits motion through a chain 21 to one of the gears 3. Each sprocket 20 has a clutch member 22 upon the inner side thereof and feathered upon the shaft 5 and between the clutch members 22 are clutch members 23. Bell crank levers 24 are provided for shifting the clutch members 23 simultaneously into engagement with the clutch members 22, each of these bell crank levers being connected by a rod 25 to an arm 26. Two arms 26 are employed, both of them being secured to the shaft 17 so as to move therewith. A lever 27 is secured to the shaft 17 and by means thereof said shaft can be turned so as thus to simultaneously actuate the bell crank levers and throw the clutch members into and out of active positions.

A sleeve 28 is loosely mounted on the shaft 17 and has a lever 29 and an arm 30. Arm 30 is connected by a rod 31 to a bell crank lever 32 which engages a clutch member 33 feathered on the shaft 5. This clutch member is adapted to engage a clutch member 34 which is formed on or secured to one side of a sprocket 35. Said sprocket is loosely mounted on the shaft 5 and is adapted to drive a chain 36 which engages a sprocket 37 secured to a shaft 38 constituting a part of the mechanism of the harvester. By means of the structure described, the wheel 2 can be propelled either forwardly or backwardly and the mechanism of the harvester can be operated either during such movement of the machine or while the machine is stationary. Shaft 5 is constantly rotating during the actuation of the shaft 12 and by coupling the sprocket 35 or the sprockets 20 thereto, said sprockets will be driven as described.

In constructing the tractor it has been found desirable to produce the same merely by removing the rear wheels of a motor vehicle, reversing the vehicle and utilizing the rear axle as the shaft 5. By then mounting the various parts described, the structure herein disclosed will be produced in an inexpensive manner and efficient results will be obtained.

While the tractor has been shown and described as connected to a harvester, it is to be understood that the same can be used in connection with any form of agricultural machine to be pushed.

It is to be understood that if desired only one chain 21 can be used instead of two. Furthermore the sprocket 35 can be located wherever desired on the shaft 5.

Obviously any desired means can be provided for adjusting the frame 1 angularly about the shaft 5 and for holding said frame 1 and the chassis 6 against movement after such movement.

What is claimed is:—

The combination with an agricultural machine having a supporting wheel, a sprocket revoluble with said wheel, and a shaft constituting a part of said machine, of brackets extending rearwardly from the machine, a chassis, a revoluble shaft journaled within the chassis and brackets, steering wheels at the rear end of the chassis, a motor, means for transmitting motion in either direction from the motor to said shaft, clutch controlled means for transmitting motion from said shaft to the sprocket, and clutch controlled means for transmitting motion from said shaft to the shaft of the agricultural machine.

In testimony that I claim the foregoing as my own, I have hereto affixed my signature in the presence of two witnesses.

VIRGIL R. DUNNING.

Witnesses:
HENRY N. BENSON,
MARJORIE HULETT.

Copies of this patent may be obtained for five cents each, by addressing the "Commissioner of Patents, Washington, D. C."